US007679526B2

(12) United States Patent
Mardirossian

(10) Patent No.: US 7,679,526 B2
(45) Date of Patent: Mar. 16, 2010

(54) SYSTEMS AND METHODS FOR USE WITH TRAFFIC TICKET PRINTING PARKING METERS

(75) Inventor: Aris Mardirossian, Germantown, MD (US)

(73) Assignee: Technology Patents, LLC, Derwood, MD (US)

( * ) Notice: Subject to any disclaimer, the term of this patent is extended or adjusted under 35 U.S.C. 154(b) by 365 days.

(21) Appl. No.: 11/712,601

(22) Filed: Mar. 1, 2007

(65) Prior Publication Data

US 2008/0212414 A1 Sep. 4, 2008

(51) Int. Cl.
*B60Q 1/48* (2006.01)

(52) U.S. Cl. ...................... 340/932.2; 340/933; 368/90

(58) Field of Classification Search ............. 340/932.2, 340/933, 937, 5.4, 5.42, 5.63; 235/375, 378, 235/381; 701/1, 36; 705/418, 13; 368/90
See application file for complete search history.

(56) References Cited

U.S. PATENT DOCUMENTS 5,845,268 A * 12/1998 Moore ........................ 705/418
6,243,029 B1 * 6/2001 Tomer ..................... 340/932.2
7,019,670 B2 3/2006 Bahar
7,029,167 B1 4/2006 Mitschele
7,230,545 B2 * 6/2007 Nath et al. ............... 340/932.2
2003/0125981 A1 * 7/2003 Pedrazzoli Pazos ............ 705/1

* cited by examiner

*Primary Examiner*—Van T. Trieu
(74) *Attorney, Agent, or Firm*—Nixon & Vanderhye P.C.

(57) ABSTRACT

Certain example embodiments of this invention relate to systems and methods for use with traffic ticket printing parking meters. According to certain example embodiments, a parking meter is provided. A payment acceptor may be operable to accept payment. A display may be operable to display a validated period during which the meter is valid, with the validated period being based on an amount of payment inserted into the payment acceptor. Vehicle identifying programmed logic circuitry may be operable to identify a vehicle parking in, parked in, and/or leaving a parking spot associated with the parking meter. A printer may be operable to print a parking ticket when a parking violation occurs, with the parking ticket including vehicle identification information from the vehicle identifying programmed logic circuitry and/or parking violation information.

19 Claims, 5 Drawing Sheets

SYSTEMS AND METHODS FOR USE WITH TRAFFIC TICKET PRINTING PARKING METERS

FIELD OF THE INVENTION

Certain example embodiments of this invention relate to parking meters and techniques for issuing tickets relating to such meters. More particularly, certain example embodiments of this invention relate to systems and methods for use with traffic ticket printing parking meters, in which vehicle information is captured for a vehicle parking or parked at a parking meter and, when a parking violation occurs (e.g., when a meter's time expires), a traffic ticket is automatically generated for the vehicle in violation.

BACKGROUND AND SUMMARY OF EXAMPLE EMBODIMENTS OF THE INVENTION

Parking meters allow drivers of vehicles to park in metered parking spots on limited, pay-to-park bases. FIG. 1 is an illustrative, conventional parking meter 100. The parking meter 100 has a reinforced outer casing 102 to store and protect money inserted into the payment accepter 104. Money inserted into the payment acceptor 104 essentially allows a driver to rent a spot for a certain amount of time, with that time being displayed on a display 108, which is shown as a digital readout (although analog needles and other suitable displays have been used). Typically, the meter 100 is connected to a pole 110, which is, in turn, firmly implanted in the ground proximate to the parking spot.

Authorized parking enforcement personnel may collect the money stored in meters, for example, using the keyed entry or locking mechanism 106. Such authorized parking enforcement personnel also may check the status of the parking meters and issue parking violations or tickets to drivers who are parked in spots with expired meters. Typically, this ticketing process involves a complicated and time-consuming process of recording information about the vehicle (e.g., license plate number, state of registration, make/model of the vehicle, etc.), the violation (e.g., time, location, etc.), writing up a ticket by hand, etc. A copy of the information is provided to the vehicle or driver thereof, often by placing a small paper ticket on the windshield of the vehicle. Another copy of the information is sent to the enforcement location (e.g., motor vehicle administration, department of motor vehicles, local enforcement office, etc.). Drivers then have to pay their tickets by mail, or over the phone.

Unfortunately, conventional parking meters and associated ticketing processes suffer from several disadvantages. For example, time and money may be wasted while parking enforcement personnel walk about in search of parking violations. Also, parking enforcement personnel cannot check all meters simultaneously. Thus, revenue may be lost as a result of drivers failing to provide payment to their meters, and/or parking tickets not being issued to drivers parked at expired meters. Conventional techniques therefore are not always "fair" in the sense that some drivers who deserve tickets are not ticketed while others are ticketed.

Thus, it will be appreciated that there exists a need for improved parking meter related techniques.

One aspect of certain example embodiments of this invention relates to parking meters configured to identify vehicles parked in their spots. Such identification may be accomplished by way of a camera or other video/image capture device located on or proximate to the meter, and/or via a receiver, transmitter and/or transceiver located on the vehicle and/or meter.

Another aspect of certain example embodiments of this invention relates to parking meters configured to print parking tickets via a printer located on the meter.

In certain example embodiments of this invention, there is provided a parking meter. A payment acceptor may be operable to accept payment. A display may be operable to display a validated period during which the meter is valid (i.e., during which parking in the corresponding spot is legal), with the validated period being based on an amount of payment inserted into the payment acceptor. Vehicle identifying programmed logic circuitry may be operable to identify a vehicle parking in, parked in, and/or leaving a parking spot associated with the parking meter. A printer may be operable to print a parking ticket when a parking violation occurs, with the printed parking ticket including (a) vehicle identification information from the vehicle that was detected by the meter (e.g., one or more of license plate number, state of registration; vehicle owner; vehicle serial and/or model number; DMV identifier, etc.), and (b) parking violation information (e.g., money amount owed due to ticket, violation, and/or the like).

In certain other example embodiments of this invention, there is provided a method of issuing a parking violation ticket to a vehicle parked at a parking meter. Vehicle identification information may be gathered from the vehicle parking in, parked in, and/or leaving a spot associated with the parking meter. When payment is inserted into a payment selector of the parking meter, an amount of time during which the meter is validated may be updated. When the amount of time during which the meter is validated has lapsed, a parking violation ticket may be printed, with the parking violation ticket including the vehicle identification information and/or parking violation information.

Certain example embodiments may identify a vehicle using an image and/or video captured by an image capture device (e.g., a camera). Certain other example embodiments may identify a vehicle using a transceiver and/or receiver located on (including "in") the meter that communicates with a transceiver (or transmitter, or receiver) or the like on the vehicle. These techniques may be used with one or more of front-in and/or back-in parking spots, angled parking spots, parallel parking spots, well-defined parking areas, etc.

The aspects and embodiments may be used separately or applied in various combinations in different embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
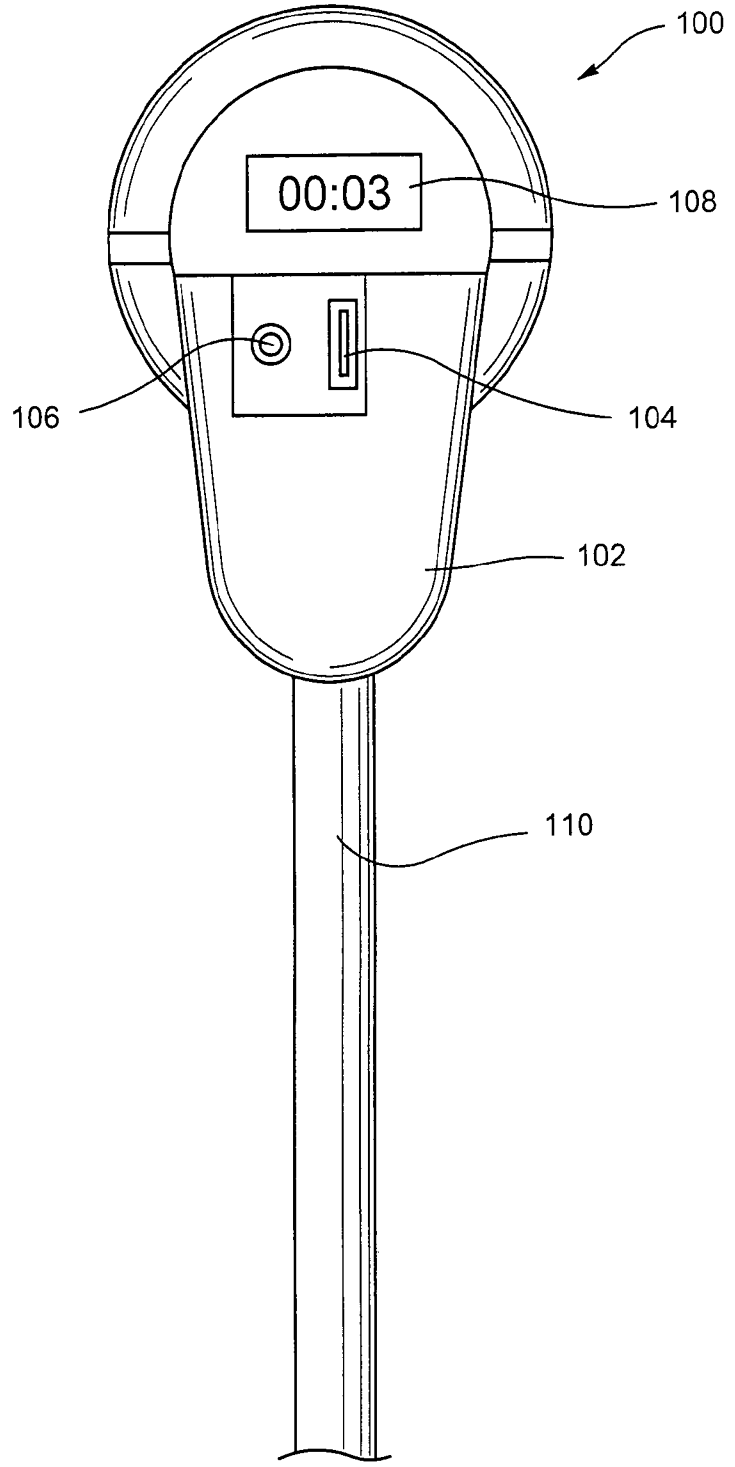
FIG. 1 is an illustrative, conventional parking meter.
Figure 2:
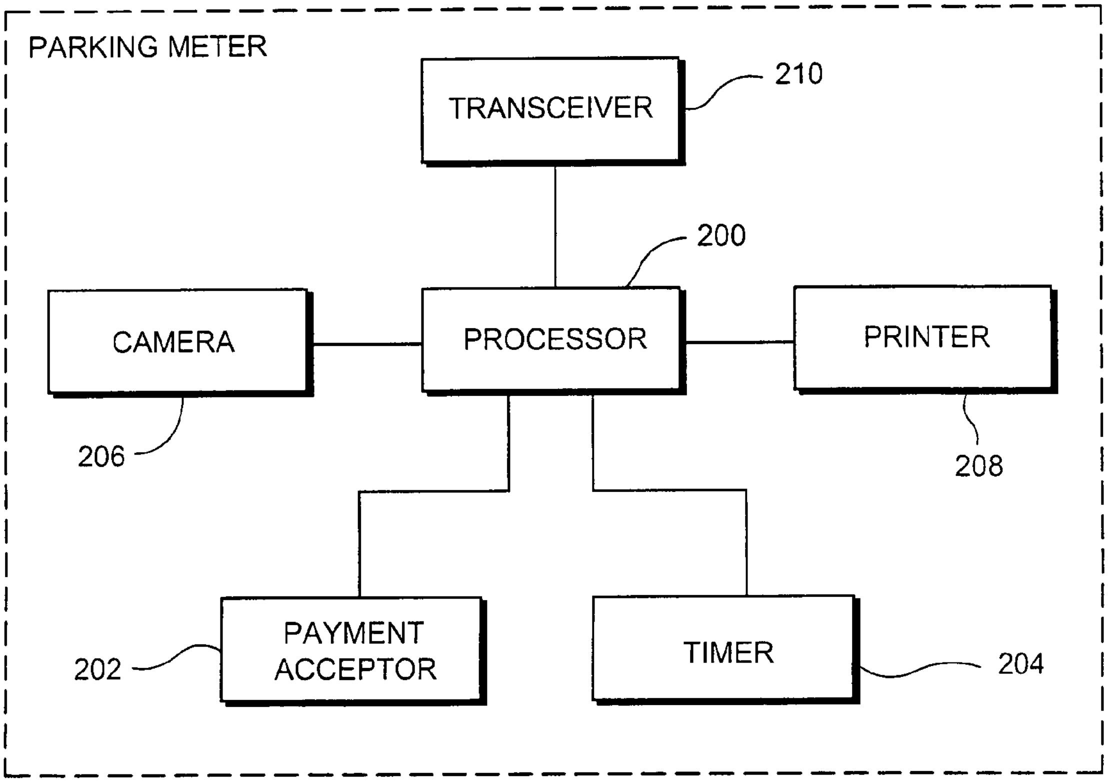
FIG. 2 is an illustrative block diagram of a parking meter in accordance with an example embodiment.

Referring now more particularly to the drawings, FIG. 2 is an illustrative block diagram of a parking meter in accordance with an example embodiment. The improved parking meter includes a processor 200. Operably connected to the processor 200 is a payment acceptor 202 for accepting payment. The payment acceptor 202 is not limited to accepting any particular type or types of payments. For example, certain example embodiments may accept coins, bills, credit/debit cards, etc. Based at least on the payment supplied to the payment acceptor 202, the processor 200 will calculate an amount of time for which parking at the meter is permitted (e.g., 15 minutes per 25 cents inserted) and instruct the timer 204 to alert it when that time period has elapsed. A camera 206 (e.g., a digital camera or the like) also may be operably connected to the processor 200. The camera 206 may be configured to take a picture of the vehicle parked in (or in the process of parking in) the spot associated with the meter. To facilitate image and/or video capture, the camera 206 may be movably mounted on the meter (e.g., it may rotate, swivel, move within the meter, etc.) and/or it may include various pan/title/zoom features of cameras. The image may be passed in digital form to the processor 200 and, in certain example embodiments, it may be stored on a computer-readable storage medium (not shown) for further use. A printer 208 may print a parking ticket when the processor 200 informs it that a parking violation has occurred. Any suitable printer may be used. For example, a small thermal printer of the sort found in certain fax machines, a printer of the sort found in certain adding machines, a printer of the sort found at certain point-of-sale checkouts, and/or more robust printers may be used. In certain example embodiments, a transceiver 210 may communicate the parking ticket information to a central clearinghouse, to authorized enforcement personnel walking around with an appropriately configured corresponding transceiver, etc. Alternatively or in addition, authorized enforcement personnel may have access to a removable computer-readable storage medium so that parking violation information may be retrieved (e.g., downloaded and/or saved to a device, removed and taken to another location, etc.).

In certain example embodiments, the transceiver 210 may additionally or in the alternative record and/or send information to a corresponding transceiver located on the vehicle in the associated parking spot. For example, when a violation is detected, the processor 200 may cause the transceiver 210 to communicate automatically with a transceiver located on the vehicle. The transceiver 210 may interrogate the vehicle's transceiver to determine identifying information, such as, for example, the license plate number, state of registration, registered owner, VIN, etc. Both the transceiver 210 and the transceiver on the vehicle may have limited ranges and/or directional signal emanations to reduce the likelihood that vehicles will be identified incorrectly.

The parking ticket printed by the printer 208 may include certain information about the vehicle and/or the parking infraction. For example, based on the picture taken by the camera 206, the license plate number, state of registration, color of the vehicle, etc. may be recorded. It will be appreciated that the processor 200 may be operable to perform optical character recognition (OCR) functions, for example, to determine the license plate number of the vehicle. The processor 200 may be further operable to provide other graphics manipulations, for example, to isolate the license plate (e.g., from the surrounding grill of the car, etc.), rotate and/or skew the license plate (e.g., if it the vehicle is parked at an angle with respect to the camera 206), determine the color of the vehicle (e.g., by matching it to known color palettes), etc. The meter may internally keep track of the date and time and further supply this information to the processor 200. The meter also may be pre-programmed to indicate its location (e.g., outside of 600 Dulany Street, Alexandria, Va., third meter down).

Figure 3A:
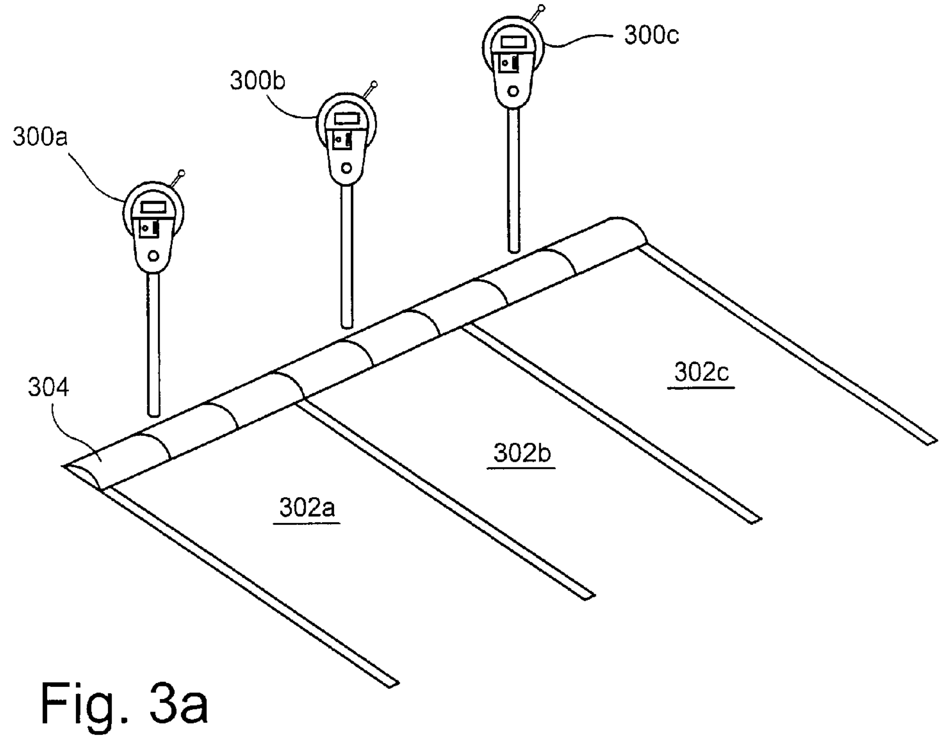
FIG. 3*a* is a first parking arrangement used to illustrate certain principles of certain example embodiments.

FIG. 3*a* is a first parking arrangement used to illustrate certain principles of certain example embodiments. In FIG. 3*a*, three meters 300*a-c* located proximate to a curb 304 are arranged so as to correspond to parking spots 302*a-c*, respectively. It will be appreciated from FIG. 3*a* that the camera 206 of a meter 300 may take a picture of a vehicle in one of these "front-in" or "back-in" spots 302*a-c* when the meter is expired. Also, although spots 302*a-c* are shown as being substantially parallel and substantially adjacent to one another and also substantially perpendicular to curb 304, the present invention is not so limited. For example, the spots 302*a-c* may be angled (e.g., with respect to the curb) such while remaining front-in and/or back-in spots. Such arrangements are sometimes found on hills, one-way areas, etc.

In certain jurisdictions, front license plates are not required. Thus, if a vehicle without a front license plate pulls into a spot 302 of FIG. 3*a*, it may not be possible to capture a picture of the vehicle's license plate. This situation may be resolved in one or more of several ways. For example, it will be appreciated that a camera has a substantially conical field of view. Thus, as a vehicle pulls in and/or away, the license plate of the vehicle will be presented to the camera at an angle. Thus, when the vehicle pulls in, a picture may be taken and stored in case a violation is recorded. Alternatively, or in addition, when the vehicle pulls out, a picture may be taken. It will be appreciated that the meter may further include a motion detector to assist in a determination of when a vehicle is pulling in, pulling out, performing a "correction" (e.g., the driver is realigning the vehicle to better position it within the parking spot), and/or merely passing by. In certain other example embodiments, suitable identifying information may be provided to the meter by means of the transceiver 210 located on the meter and the corresponding transceiver located on the vehicle, as noted above.

Figure 3B:
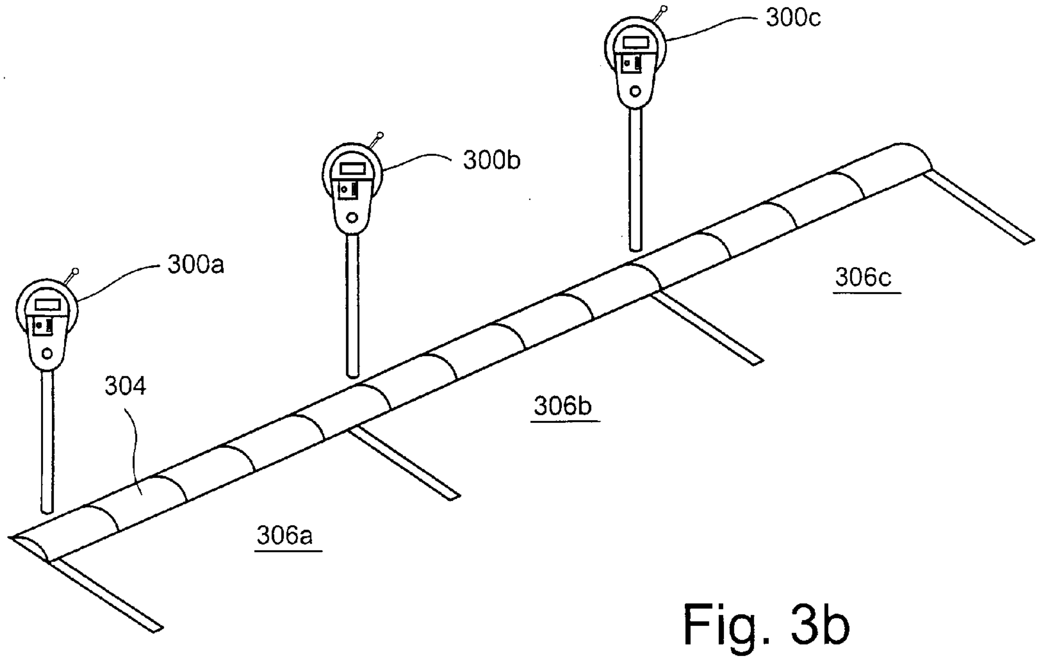
FIG. 3*b* is a second parking arrangement used to illustrate certain principles of certain example embodiments.

FIG. 3*b* is a second parking arrangement used to illustrate certain principles of certain example embodiments. The arrangement shown in FIG. 3*b* generally requires parallel parking. Thus, because parallel parking typically requires maneuvering a vehicle at certain angles with respect to the meters, the license plate of the vehicle will be presented to the conical field of view of the camera 206 of the meter, in a manner similar to that described above. In such cases, the picture of the vehicle may be taken when the vehicle is pulling in, and it may be stored for potential use in the case that a violation occurs. Also, as above, certain example embodiments may include a transceiver 210 located on the meter that may communication with a corresponding transceiver located on the vehicle to provide vehicle identifying information when its license plate is not readily visible, obscured, etc.

Also as noted above, certain example embodiments may include rotatable, swivelable, and/or otherwise adjustable/movable cameras 206 in parking meters so as to obtain a better view of a license plate for a wide variety of vehicles. It will be appreciated that the meters shown in FIGS. 3*a* and 3*b* are not confined to any particular location with respect to the spots. For example, it may be advantageous to locate meters close to one end of each spot in some parking areas, whereas it may be advantageous to locate meters in the center of each spot in other parking areas. Such positions may be chosen, for example, to increase the fields of view of the cameras associated with the meters, obtain better images of the license plates, reduce the likelihood of faulty or otherwise incorrect detections, etc.

Figure 3C:
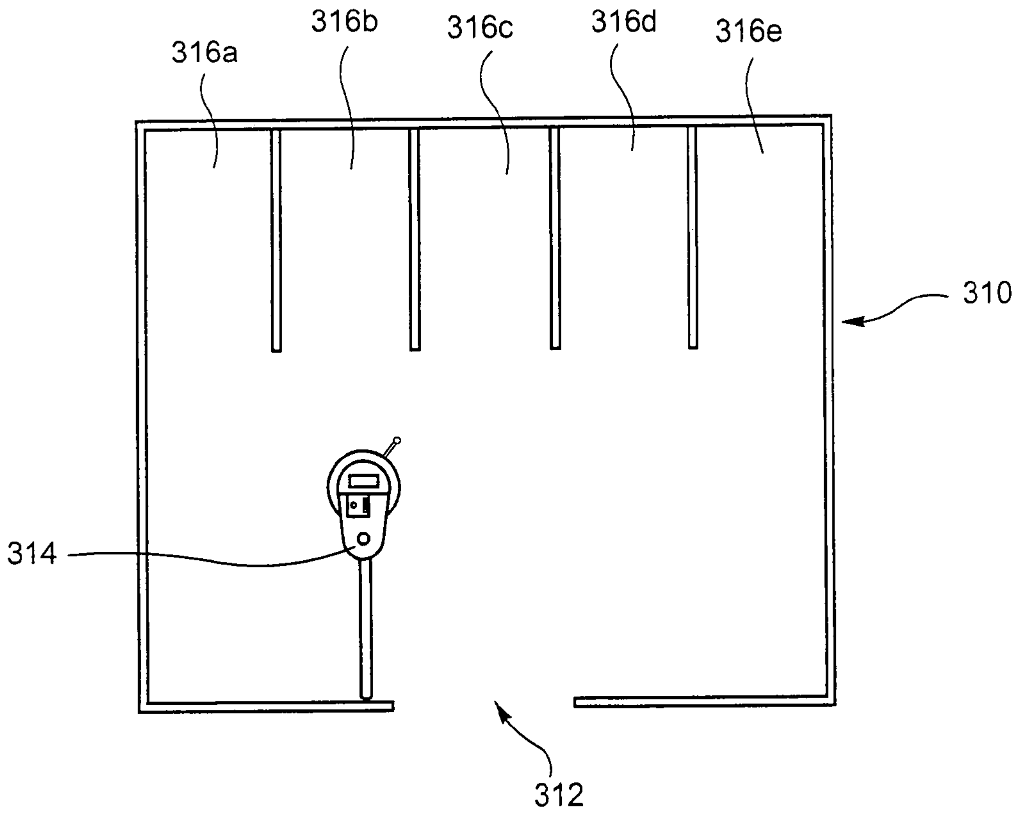
FIG. 3*c* is a third parking arrangement used to illustrate certain principles of certain example embodiments.

FIG. 3*c* is a third parking arrangement used to illustrate certain principles of certain example embodiments. The arrangement shown in FIG. 3*c* includes a single, well-defined lot 310. Drivers desiring to park their vehicles within lot 310 have to pass through an entrance 312. Although one entrance 312 is shown, it will be appreciated that certain well-defined lots may have multiple entrances. Thus, when a car enters the lot 310, it must pass by meter 314 to park in one of the spots 316*a-e*. The meter 314 may accept payment for all vehicles parked in the lot by including an interface that allows the drivers to enter a spot number, vehicle information, etc. A camera attached to the meter 314 may capture and/or compare the license plate numbers to vehicles entering and leaving to reduce the likelihood of a situation where drivers will park in the lot and leave without paying or leave paying an amount less than what is due. The meter 314 also may include a transceiver of the type described above in addition or in the alternative, the transceiver being suitable for identifying vehicles entering, parking in, and/or leaving the lot.

Figure 4A:
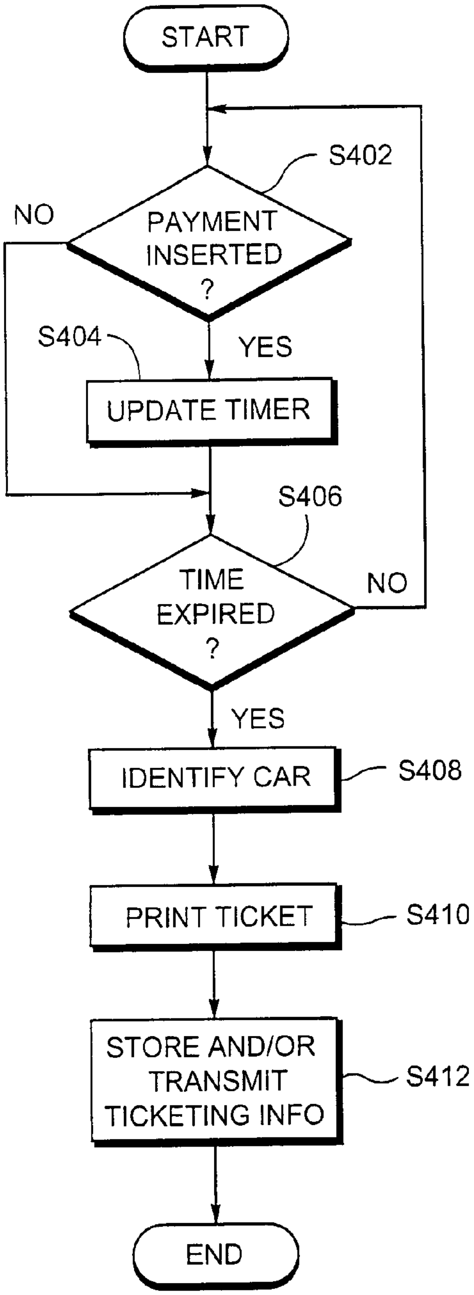
FIG. 4*a* is an illustrative flowchart used to describe certain example embodiments; and, FIG. 4*b* is another illustrative flowchart used to describe certain other example embodiments.

FIG. 4*a* is an illustrative flowchart used to describe certain example embodiments. If payment is inserted into the meter in step S402, the timer is updated in step S404 in dependence on the amount of the payment. For example, 25 cents may increase the time allotted by 15 minutes. After the timer is updated in step S404 or in the case that no payment is inserted in step S402, it is determined whether the time allotted by the timer is expired in step S406. If the time has not expired, then the process returns to step S402 to monitor for the insertion of payment. However, if the time has expired, then the vehicle is identified in step S408. After the vehicle is identified in step S408, the parking violation ticket may be printed in step S410. Information about the parking violation (e.g., location, date/time, vehicle identification information, etc.) may be stored on the meter and/or transmitted to a management center (e.g., department of motor vehicles, motor vehicle administration, local parking enforcement office, etc.) remote from meter in step S412. Of course, it will be appreciated that the meter will run until it expires.

Figure 4B:
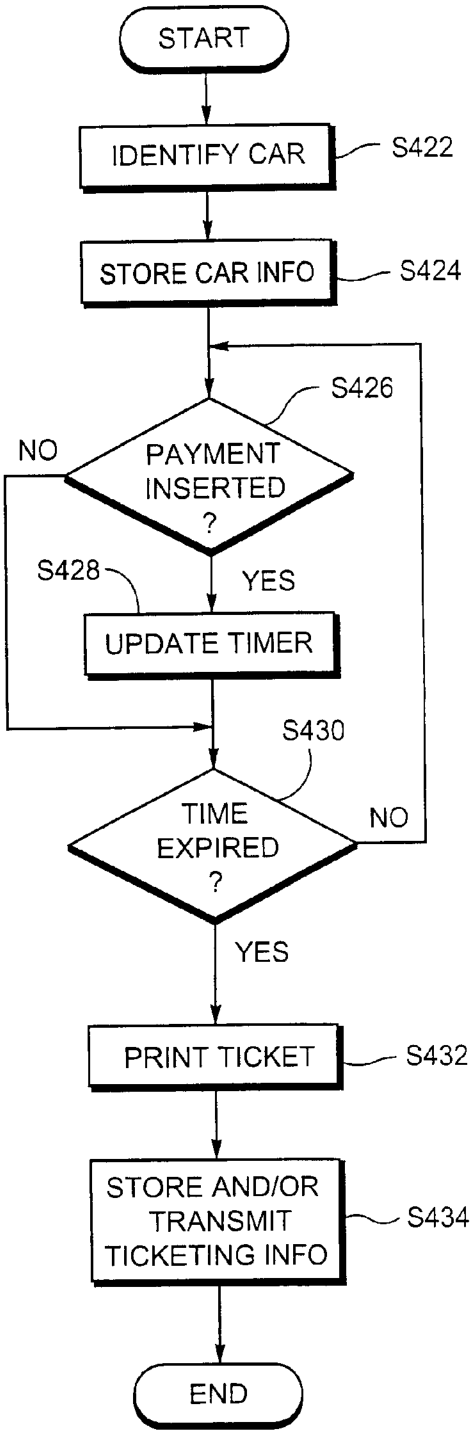

FIG. 4*b* is another illustrative flowchart used to describe certain other example embodiments. In step S422, the vehicle is identified, and vehicle information (e.g., license plate number, state of registration, vehicle color, etc.) is stored in step S424 (e.g., to a temporary computer-readable storage medium operably connected to the meter). If payment is inserted into the meter in step S426, the timer is updated in step S428 in dependence on the amount of the payment. After the timer is updated in step S428 or in the case that no payment is inserted in step S426, it is determined whether the time allotted by the timer is expired in step S430. If the time has not expired, then the process returns to step S426 to monitor for the insertion of payment. However, if the time has expired, then a parking violation ticket may be printed in step S432 based on vehicle identification information from step S422 that is stored in step S424. Then, information about the parking violation (e.g., location, date/time, vehicle identification information, etc.) may be stored on the meter and/or transmitted to a management center (e.g., department of motor vehicles, motor vehicle administration, local parking enforcement office, etc.) remote from meter in step S434.

The identification process of step S408 in FIG. 4*a* and/or of step S422 in FIG. 4*b* may include taking one or more of a picture of a vehicle; performing graphics manipulations and/or OCR functions on the image to identify the license plate number, state of registration, etc.; matching the color, make, and/or model to a database of known features; etc. The identification process also may be facilitated by means of transceivers (e.g., RF transceivers) located on the vehicle and/or the meter, with the transceiver on the vehicle being configured to broadcast identifying information detectable by the meter. The identification process may take place when the vehicle initially pulls into and/or out of a spot, when a vehicle pulls into and/or out of a regulated lot, etc.

The processes described with reference to FIGS. 4*a* and 4*b* may be implemented in a variety of situations. For example, that processes may be implemented in connection with front-in and/or back-in spots described with reference to FIG. 3*a*. The processes also may be used in connection with the parallel parking arrangements described with reference to FIG. 3*b*. Also, the processes may be used in connection with the well-defined parking lot arrangements described with reference to FIG. 3*c*.

Additionally, the processes described with reference to FIGS. 4*a* and 4*b* may implement motion sensors and/or smart optical sensors. Such devices, which may be included in the meters themselves, may reduce the likelihood of the meter taking pictures of empty spots, random passers-by (e.g., pedestrians, vehicles, etc.), and the like.

Moreover, the meters may allow for certain "grace periods," or predetermined periods of time between when a driver's meter expires and when a parking violation ticket issues. Such grace periods may be useful when a driver initially pulls into a spot, as it might be considered unfair to ticket a driver for pulling into an already-expired spot before the driver has an opportunity to pay. Similarly, a driver may be entitled to a short grace period when initially parking and/or renewing an about-to-expire meter while the driver looks through a wallet, purse, ashtray, etc. for additional coinage or other money to insert into the meter. Such grace periods may be variable. An initial grace period may be, for example, a minute or even two minutes, whereas a grace period after expiration may be only 30 seconds to one minute. Of course, such grace period times and time intervals are provided by way of example and without limitation. In certain example embodiments, grace periods may be programmed into the meter itself by authorized enforcement personnel, etc.

As alluded to above, the parking meters of certain example embodiments may be beneficial to cities, towns, or other areas by providing more efficient meter monitoring and thus more efficient enforcement and payment collection. Also, the tickets issued by such meters may further help to reduce transaction costs, as tickets may be payable via automated telephone, web-based, or other systems. In addition, the cameras on the meters also may be useful for increasing safety in parking areas. For example, a would-be thief may be less likely to attempt a crime if it became known that cameras were disposed on or proximate to the meters.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A parking meter, comprising:

a payment acceptor operable to accept payment;

a display operable to display a validated period during which parking in a parking space corresponding to the meter is valid, the validated period being based on an amount of payment inserted into the payment acceptor;

a transceiver for receiving a signal from a vehicle parked or parking in the parking space corresponding to the meter in order to identify the vehicle, the transceiver including vehicle identifying programmed logic circuitry operable to identify the vehicle parked or parking in the parking space;

a camera configured to capture an image and/or video of the vehicle including at least a license plate of the vehicle as the vehicle is being parked in the parking space, the camera being movably and/or rotatably mounted on the meter; and, a printer operable to print a parking ticket when a parking violation occurs, the printed parking ticket including (a) vehicle identification information from the vehicle that was detected by the meter, and (b) parking violation information.

2. The parking meter of claim 1, wherein the vehicle identification information on the ticket comprises one or more of a license plate number, state of registration, vehicle owner, vehicle serial and/or model number; and/or DMV vehicle and/or vehicle owner identifier.

3. The parking meter of claim 1, wherein the transceiver including means for sending violation information relating to the ticket, including a ticket amount and violation cause, to another transceiver located on the vehicle so that the vehicle is informed of the ticket and has an electronic indication and/or copy of the ticket.

4. The parking meter of claim 1, wherein the transceiver is further configured to communicate with a person charged with parking enforcement.

5. The parking meter of claim 4, wherein the person charged with parking enforcement is located at a location remote from the meter.

6. The parking meter of claim 1, wherein the vehicle identification information includes a license plate number and a state of registration of the vehicle.

7. The parking meter of claim 1, wherein the parking violation information includes a time, date, and location of the violation.

8. The parking meter of claim 7, wherein the parking violation information further includes a monetary amount of the violation.

9. The parking meter of claim 1, wherein the parking violation information includes identification information identifying the meter that printed the ticket.

10. A parking meter system, comprising:

a payment acceptor operable to accept payment;

a display operable to display a validated period during which parking in a parking space corresponding to the meter is valid, the validated period being based on an amount of payment inserted into the payment acceptor;

a camera configured to capture an image and/or video of the vehicle including at least a license plate of the vehicle as the vehicle is being parked in the parking space, the camera being movably and/or rotatably mounted on the meter;

a transceiver for receiving a signal from a vehicle parked or parking in the parking space corresponding to the meter in order to identify the vehicle, the transceiver including vehicle identifying circuitry operable to identify the vehicle parked or parking in the parking space; and the transceiver including means for sending violation information relating to a parking ticket generated by the meter relating to the vehicle, including a ticket amount and violation cause, to another transceiver located on the vehicle so that the vehicle is informed of the parking ticket and has an electronic indication and/or copy of the ticket.

11. The parking meter system of claim 10, wherein the violation information sent by the transceiver of the meter to the transceiver of the vehicle includes both: (a) vehicle identification information relating to the vehicle that was detected by the meter, and (b) parking violation information.

12. The parking meter system of claim 11, wherein the vehicle identification information comprises one or more of a license plate number, state of registration, vehicle owner, vehicle serial and/or model number; and/or DMV vehicle and/or vehicle owner identifier.

13. The parking meter system of claim 11, wherein the parking violation information includes a time, date, and location of the violation.

14. The parking meter system of claim 13, wherein the parking violation information further includes a monetary amount of the violation.

15. The parking meter system of claim 11, wherein the parking violation information includes identification information identifying the meter that printed the ticket.

16. A method of issuing a parking violation ticket to a vehicle parked at a parking meter, the method comprising:

gathering vehicle identification information from the vehicle as the vehicle is being parked in a spot associated with the parking meter by taking an image and/or video of the vehicle and performing graphics processing the image and/or video using a camera associated with the parking meter;

when payment is inserted into a payment selector of the parking meter, updating an amount of time during which the meter is validated;

when the amount of time during which the meter is validated has lapsed, printing a parking violation ticket, the parking violation ticket including the vehicle identification information and/or parking violation information.

17. The method of claim 16, further comprising transmitting the vehicle identification information and/or the parking violation information to a person charged with parking enforcement.

18. The method of claim 17, wherein the person charged with parking enforcement is located at a location remote from the meter.

19. The method of claim 17, further comprising one or more of:

(a) wherein the gathering vehicle identification information step further comprises obtaining vehicle identification information from a vehicle transceiver configured to transmit the vehicle identification information;

(b) granting a period during which the vehicle may be parked at the meter without the amount of time during which the meter is validated is not decreased;

(c) storing the vehicle identification information on a computer-readable storage medium of the meter; and/or (d) wherein the vehicle identification information is gathered after the amount of time during which the meter is validated is expired.

* * * * *